United States Patent [19]

Masui et al.

[11] Patent Number: 5,735,076
[45] Date of Patent: Apr. 7, 1998

[54] METHOD FOR PRODUCING HIGH QUALITY CROP

[75] Inventors: Masaaki Masui, Chiba; Arihito Fujiwara, Ibaraki; Takanori Anazawa; Yasuko Watanabe, both of Chiba, all of Japan

[73] Assignee: Dainippon Ink and Chemicals, Inc., Tokyo, Japan

[21] Appl. No.: 735,568

[22] Filed: Oct. 23, 1996

Related U.S. Application Data

[63] Continuation of Ser. No. 390,315, Feb. 17, 1995, abandoned.

[51] Int. Cl.⁶ .................................................. A01G 25/00
[52] U.S. Cl. .................................................. 47/58
[58] Field of Search .................................................. 47/58

[56] References Cited

U.S. PATENT DOCUMENTS

| | | | |
|---|---|---|---|
| 2,912,793 | 11/1959 | Stone et al. | 47/58 |
| 2,947,112 | 8/1960 | Morrison | 47/58 |
| 4,516,984 | 5/1985 | Warner et al. | 96/6 |
| 4,675,165 | 6/1987 | Kuckens et al. | 47/58 |
| 4,812,342 | 3/1989 | Linde et al. | 428/35.4 |
| 5,254,143 | 10/1993 | Anazawa et al. | 96/6 |

FOREIGN PATENT DOCUMENTS

| | | | |
|---|---|---|---|
| 3719215 | 12/1988 | Germany | 47/58 |
| 2042491 | 9/1980 | United Kingdom | 47/59 |

OTHER PUBLICATIONS

Black, C.A., "Plant Response to Aeration" *Soil–Plant Relationships* 2nd Ed. 1968 John Wiley & Sons, Inc., N.Y. pp. 187–201.

*Primary Examiner*—James R. Feyrer
*Assistant Examiner*—Kent L. Bell
*Attorney, Agent, or Firm*—Armstrong, Westerman, Hattori, McLeland & Naughton

[57] ABSTRACT

A method for producing a high-quality crop is described, which comprises irrigating soil with oxygen-removed water or water supersaturated with a non-oxygen gas, and the water is preferably drenched into the soil and/or irrigated onto the soil surface which is coated with a substantially air non-permeable sheet.

20 Claims, 3 Drawing Sheets

METHOD FOR PRODUCING HIGH QUALITY CROP

This application is a continuation of application Ser. No. 08/390,315 filed Feb. 17, 1995, now abandoned.

FIELD OF THE INVENTION

The present invention relates to a method for normally and excellently growing a plant to thereby give a high-quality crop.

BACKGROUND OF THE INVENTION

Factors required for the normal and excellent growth of crops include (1) control of pests which inhibit the normal growth of the crops; and (2) supply of nutrients, oxygen, appropriates loads, and so on.

As a means for controlling pests, for example, (a) field husbandry means; (b) chemical means; (c) biological means; and (d) physical means have been known. However, crops in great demand cannot be continuously supplied by the field husbandry means (a) such as prevention of damages due to soil nematodes by crop rotation. In the case of the chemical means (b) using insecticides, use of organochlorine insecticides causes the problem of prolonged persistence in the soil or crops, while use of organophosphorus insecticides cannot achieve satisfactory effects and also causes the problem of the persistence in crops. In the case of fumigants such as chloropicrin or methyl bromide, the former cannot be used in suburban areas because of its irritative and lachrymal properties and the use of the latter has been restricted worldwide because of a strong probability of breaking the ozone layer. It is considered that the use of methyl bromide will be completely prohibited before long. Examples of the biological means (3) include biological insecticides such as BT agent, a method, wherein the target crop is cultivated after plants producing a nematocidal component such as marigold for controlling root lesion nematodes (*Protylenchus sp*) or kobutoriso (*Crotalaria sp*) for controlling root knot nematodes (*Meloidogyne sp*) is grown. However, the BT agent can be used only in a limited area because of its toxicity on silkworms. On the other hand, the cultivation of marigold or kobutoriso required 3 to 4 months, which seriously restricts planting of the target crop. Also, troublesome manuring practice is needed in this case. Although physical means (4) such as bactericidal and insecticidal treatments with solar energy in a house and disinfection of the soil for nursery beds with steam are effective in a highly restricted area, they cannot be applied to large-sized houses and fields. It is sometimes observed that moles invade a lawn and so on for grazing to catch insect larvae and earthworms and thus damage the appearance of the lawn and so on. However, no means effective in preventing them has been established so far. Accordingly, it has been urgently required to develop an effective method for controlling pests over a wide range which is harmless to the environment and users and causes no replant failure.

On the other hand, there has been known a method for producing a so-called "full-bodied" crop which comprises controlling the growth of the root and applying a load to the crop by using a large-sized pot or a box (container) made of polyethylene or vinyl chloride to thereby elevate the contents of water-soluble components of the crop. However, since this method requires an equipment for accommodating pots and containers and is poor in productivity, it has not been spread. Crops such as melon with a high sugar content can be obtained by cultivating in a plastic house while strictly controlling the moisture content. However, this method requires much labor, which makes the product expensive. Accordingly, it has been required to develop a method for producing a high-quality crop on a large scale which can be easily controlled and achieve a high productivity.

SUMMARY OF THE INVENTION

An object of the present invention is to provide a method for producing a high-quality crop which can be easily managed and suffers from no decrease in productivity with exterminating pests inhabiting in the soil by using only a reduced amount of agricultural chemicals or without using any insecticide.

Under these circumstances, the inventors have conducted extensive studies in order to solve the above-mentioned problems. As a result, they have successfully found out that, when the soil is irrigated with oxygen-removed water or water supersaturated with a non-oxygen gas, the density of pests in the soil can be lowered and crops can be protected therefrom; and that, when such water is applied to the roots of crops, the sugar contents of fruit vegetables can be elevated and high-quality crops can be obtained, thus completing the present invention.

Accordingly, this and other objects of the present invention have been attained by a method for producing a high-quality crop which comprises irrigating soil with oxygen-removed water (oxygen-reduced water) or water supersaturated with a non-oxygen gas.

Figure 1:
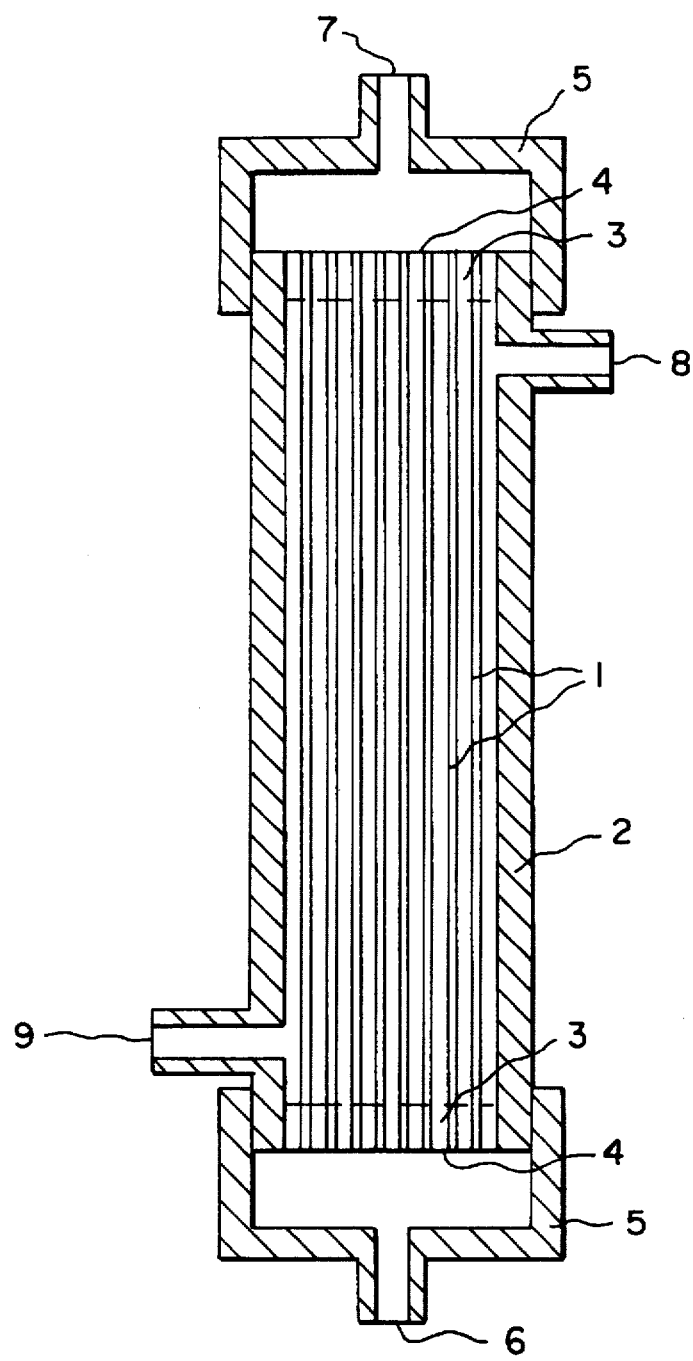
FIG. 1 is a vertical sectional view of a membrane module employed in the present invention.

In these figures, each numeral stands for the following meaning:

1: hollow fiber membrane;
2: module housing;
3: resin sealing part;
4: end face;
5: cap;
6: liquid inlet;
7: liquid outlet;
8: vacuum connecting port or gas introducing port;
9: gas outlet;
10: membrane module;
11: raw water;
12: branched pipe;
13: flow rate controlling valve;
14: leak valve;
15: water supersaturated with non-oxygen gas;
16: device for producing low-oxygen air;
17: pressure regulating valve;
18: leak valve;
19: leak gas;
20: gas pump;
21: flow rate controlling valve;
22: water pump;
23: lead-in pipe for raw water;
24: branched pipe.

DETAILED DESCRIPTION OF THE INVENTION

The term "oxygen-removed water" as used herein means a water having a dissolved oxygen concentration of 50% or less, preferably 30% or less, and more preferably 10% or less, of the saturated dissolved oxygen concentration. It may be prepared by any method, so long as it satisfies the above-mentioned requirement. Although the lower limit of the dissolved oxygen concentration may be specified by itself, a low dissolved oxygen concentration suffers from no disadvantage. From the viewpoint of efficacy, the lower the dissolved oxygen concentration is, the more preferable it is. For example, water of a dissolved oxygen concentration of 1% or less, or 0.1% or less, is usable herein. Although the efficacy is saturated with a decrease in the dissolved oxygen concentration, the production cost is also elevated therewith. When the cost is taken into consideration, therefore, a dissolved oxygen concentration of from 1 to 10% is particularly preferable.

The dissolved oxygen concentration can be determined by the Ostwald method [Jikken Kagaku Koza (*Guidance for Chemical Experiments*) I, Kihon Sosa (Fundamental Procedures) [I], 241, (1975) published by Maruzen], mass spectrometry, with use of a convenient oxygen analyzer of, for example, Galvanic cell type or polarography type, or by colorimetry.

The term "saturated dissolved oxygen concentration" means the dissolved oxygen concentration of water being in equilibrium with the air under the atmospheric pressure at the point for using the oxygen-removed water. The saturated dissolved oxygen concentration level of water under the air of 1 atm is about 8.1 ppm by weight (hereinafter referred to simply as ppm) at 25° C. and about 9.7 ppm at 17° C. [see Kagaku Binran (*Chemical Handbook*)]. Accordingly, the dissolved oxygen concentration in the oxygen-removed water to be used in the present invention is preferably from 0.01 to 5 ppm, more preferably from 0.1 to 1 ppm.

In addition to oxygen, the oxygen-removed water may contain any other gases dissolved therein at any concentration without restriction, so long as they exert no undesirable effects on plants. These gases other than oxygen may be dissolved therein either at supersaturated, saturated or unsaturated levels. For example, it does not matter that dissolved gases (for example, nitrogen) other than oxygen are eliminated and the concentrations thereof are changed in the step of reducing oxygen.

The term "water supersaturated with a non-oxygen gas" (hereinafter sometimes referred to simply as non-oxygen gas-supersaturated water) as used herein means water in which at least one gas other than oxygen (i.e., non-oxygen gas) is dissolved at a level exceeding the saturated dissolved gas concentration at the temperature and point for using the non-oxygen gas-supersaturated water. It may be prepared by any method, so long as it satisfies the above-mentioned requirement.

The term "non-oxygen gas" as used herein means at least one gas other than oxygen. Although any gas may be used therefor so long as it exerts no undesirable effect on the soil environment and plants, suitable examples thereof include a suffocating gas, which has no toxicity by itself but induces suffocation of organisms through the elimination of oxygen, for example, nitrogen gas, carbon dioxide gas (carbonic acid gas), an inert gas such as helium or argon, and hydrocarbon such as methane or ethane. The type and composition ratio of these gases are not particularly restricted. However, it is preferable to use nitrogen gas and/or carbon dioxide gas therefor from the viewpoint of easiness in handling and cost. The expression "a gas exerting undesirable effects on the soil environment and plants" means those which are reactive with soil constituents, organisms in the soil or plants, for example, chlorine, hydrogen chloride, nitrogen oxides, ammonia, formaldehyde, methyl bromide, chloropicrin, dichloroethylene and organophosphorus compounds. It is inadequate to use such a gas as the non-oxygen gas in the present invention. However, it does not matter that a suffocating gas is used as a non-oxygen gas and the above-mentioned gases are present together therewith at such a concentration as to exert no undesirable effect on plants.

When the non-oxygen gas is carbon dioxide gas, the concentration of the non-oxygen gas dissolved at the supersaturation level is preferably from 50 to 10,000 ppm, more preferably from 200 to 1,500 ppm. When it is a gas other than carbon dioxide gas, for example, nitrogen gas, the concentration thereof is preferably from 20 to 150 ppm, more preferably from 30 to 80 ppm.

When the non-oxygen gas dissolved in the water is one other than the major components of the air, it is dissolved at a supersaturation level regardless of its amount. Air-saturated water at 1 atm and at 20° C. contains about 17.8 ppm of nitrogen, about 8.8 ppm of oxygen, about 0.6 ppm of carbon dioxide gas, a trace amount of argon and the like dissolved therein and the molar fraction of oxygen is about 30% [see Kagaku Binran (*Chemical Handbook*)].

Although the non-oxygen gas-supersaturated water to be used in the present invention may contain oxygen dissolved therein, the acceptable oxygen concentration (expressed in molar fraction in all gases dissolved therein) is 15% or less, preferably 7% or less, and more preferably 3% or less. Although the lower limit of the oxygen molar fraction may be specified by itself, a low molar fraction suffers from no disadvantage, and the lower the molar fraction is, the more preferable it is. The dissolved oxygen concentration of the non-oxygen gas-supersaturated water may be either lower, equal to or higher than the saturated dissolved oxygen concentration, so long as it satisfies the above-mentioned requirement. However, in general, it is preferable for fully achieving the effects of the present invention that the dissolved oxygen concentration is equal to or lower than the saturated dissolved oxygen concentration under operation conditions (i.e., 8.8 ppm or less, more preferably 3 ppm or less, and particularly preferably 1 ppm or less, at 1 atm and at 20° C.).

The types and concentrations of gases dissolved in the water can be determined by the Ostwald method, mass spectrometry or gas chromatography. With regard to oxygen and carbon dioxide gas, determination can be made with use of a convenient electrical oxygen analyzer of, for example, Galvanic cell type or polarography type, or by colorimetry. When the gas concentration of supersaturated water is determined with such an electrical concentration analyzer, however, bubbling at the sensor part sometimes makes accurate determination impossible. In such a case, it is preferable that samples, which have been prepared by diluting the water to be analyzed with water containing a gas of which concentration is known, are analyzed and the target concentration is determined by calculation.

The oxygen-removed water to be used in the present invention may be prepared by any method selected from among various ones for reducing the concentration of oxygen dissolved in water (hereinafter referred to as degassing method), without restriction. Examples of such methods include a membrane vacuum degassing method comprising passing raw water in one side of a membrane, through which not a liquid but a gas permeates, and forming a vacuum in another side (see, for example, JP-A-63-258605; the term "JP-A" as used herein means an "unexamined published Japanese patent application"), a septum oxygen absorption method comprising contacting raw water with an oxygen absorber via a membrane through which a liquid does not permeate but a gas permeates under the using condition, a so-called vacuum degassing method comprising reducing a pressure of inner space in a packed column or a spray tower, a heat degassing method by taking advantage of a decrease in gas solubility with an increase in temperature, a bubbling method of a gas other than oxygen, an ultrasonic degassing method and an addition method of a reducing agent. Among all, the membrane vacuum degassing method and the vacuum degassing method are preferable from the viewpoint of degassing efficiency. In particular, the membrane vacuum degassing method is more preferable for the following reasons. Namely, a device therefor is a portable, small-sized one which can be easily handled, the degassing can be performed at a high extent and the oxygen-removed water can be continuously prepared in any amount.

Any membrane (for example, a flat membrane, a hollow fiber membrane) may be used as a membrane to be used in the membrane vacuum degassing, so long as a liquid cannot permeate but a gas can permeate therethrough. However, it is preferable to use a hollow fiber membrane, in particular one of 250 μm or less in inner diameter, since such a membrane makes it possible to downsize the device. Further, a heterogenous membrane is preferable as the hollow fiber membrane, since it is highly suitable as a degassing membrane because of its high permeability to gas and no leakage of water. It is preferable to use a membrane made of, for example, poly-4-methylpentene-1, since it is excellent in hydrophobicity, gas-permeation rate and strength.

In general, membranes are combined into a module and used. In this case, the form of the membrane module is not particularly restricted. For example, flat membranes may be laminated or formulated into a spiral, while hollow fiber membranes may be integrated into housing in the form of a bundle in parallel, as a bamboo fabric, or being winded up at a high sharpness. They may be either a bore-side-flow type module or a shell-side-flow type one.

The pressure reducing unit to be used in the vacuum degassing method or the membrane vacuum degassing method may be arbitrarily selected from among, for example, various vacuum pumps, aspirators and ejectors. It is preferable to use a hydraulic vacuum pump, a diaphragm vacuum pump, a dry vacuum pump or a stream aspirator therefor, since these devices withstand suction of a large amount of steam.

The non-oxygen gas-supersaturated water to be used in the present invention may be prepared by any method without restriction. Examples of such a method include a membrane gas dissolution method (see, for example, JP-A-4-7078) comprising passing raw water in one side of a membrane, through which a liquid does not permeate but a gas permeates, and supplying the gas to be dissolved to another side thereof; a pressure dissolution method comprising contacting a pressurized water with a pressurized gas in a pressure container; a method comprising bubbling a non-oxygen gas under atmospheric or elevated pressure; and a method comprising supplying water and a gas at the same time into a suction side of a water pump. It is preferable to select a method with use of a water pump or, in particular, the membrane gas dissolution method therefor from the viewpoints of gas dissolution efficiency and convenience.

Similar to the above-mentioned membrane vacuum degassing method, any membrane is usable in the membrane gas dissolution method, so long as not a liquid cannot permeate but a gas can permeate therethrough under the using condition. For the same reasons as those described above, it is preferable to use a hollow fiber membrane as a membrane and the hollow fiber membrane has more preferably an inner diameter of 250 μm or less. A heterogenous membrane is an adequate gas dissolution membrane since it never suffers from leakage of water and scarcely undergoes air diffusion. Poly-4-methylpentene-1 is suitable as a membrane material. It is also preferable to use a membrane having a hydrophilic face which is to be contacted with water, since bubbling into water can be suppressed thereby. The form of the membrane module is not particularly restricted. Examples thereof include the modules cited above with regard to the preparation of the oxygen-removed water.

In the membrane gas dissolution method, the gas to be supplied may be either a pressurized one or one being under atmospheric pressure. Also, it may be either a gas in a pure state or a gas mixture. The dissolution concentration of the gas can be elevated by increasing the partial pressure of the supplied gas. The water may be either pressurized one or one being under atmospheric pressure. However, it is preferable to use pressurized water. That is, the non-oxygen gas-supersaturated water is preferably prepared by a membrane pressure method. In order to suppress bubbling into water, it is preferable to operate the system under a pressure exceeding the total gas pressure.

Examples of the non-oxygen gas source usable herein include nitrogen or carbon dioxide cylinders, nitrogen-enriched air obtained by a membrane separation method and inert gas (burned exhaust gas).

It is further preferable to regulate the dissolved oxygen concentration of the non-oxygen gas-supersaturated water to not more than the saturated dissolved oxygen concentration under the air of 1 atm. Such a dissolved oxygen concentration level can be achieved by dissolving a non-oxygen gas in oxygen-removed water with use of one of the methods cited above with regard to the preparation of the oxygen-removed water.

It is possible that the above-mentioned degassing procedure performed not only as an independent step but also as a step of both degassing and dissolving the non-oxygen gas. That is to say, the dissolution of the non-oxygen gas and degassing can be effected simultaneously by disposing some portion of a gas, which has been contacted (including membrane contact) with a liquid, in the step of dissolving the gas.

The raw water for preparing the oxygen-removed water or the non-oxygen gas-supersaturated water to be used in the present invention may be selected from among, for example, tap water, well water, spring water, lake or marsh water, river water, purified water and reused water. In the case of the non-oxygen gas-supersaturated water, in particular, water with an unsaturated dissolved oxygen concentration is usable. Such water may be adequately employed in the preparation of non-oxygen gas-supersaturated water with a dissolved oxygen concentration lower than the saturation concentration under the air of 1 atm at temperature for usage. Examples of such water with an unsaturated dissolved oxygen concentration include well water, in which oxygen has been consumed due to reducing substances underground, and water having an oxygen concentration of which has been reduced due to oxidation of watering pipes.

The temperature of the oxygen-removed water or the non-oxygen gas-supersaturated water can be controlled, if needed. Also, they may contain additives such as salts, fertilizers, insecticides and bactericides, if needed. These additives may be added after the completion of the degassing or the gas dissolution. Alternatively, these additives may be mixed with the raw water followed by the degassing or the gas dissolution.

When allowed to stand, air is redissolved in the oxygen-removed water and the dissolution rate is elevated by stirring. When the air cannot be shut out during the storage of the oxygen-removed water, it is preferable to use the oxygen-removed water immediately after the preparation thereof. Also, it is preferable to avoid incorporation of the air or stirring as far as possible during handling of the oxygen-removed water. When allowed to stand, the non-oxygen gas in the non-oxygen gas-supersaturated water diffuses into the atmosphere. Thus, it is also preferable to use the non-oxygen gas-supersaturated water immediately after the preparation thereof.

According to the present invention, pests inhabiting the soil such as soil nematodes which prevents normal growth of a crop can be controlled by irrigating the soil with the above-mentioned oxygen-removed water or non-oxygen gas-supersaturated water. Thus the yield of the crop can be increased and a high-quality crop being excellent in, for example, color and shape, can be obtained.

The term "pests inhabiting the soil" as used herein means organisms which inhabit the soil and injure crops. Examples thereof include soil nematodes preventing growth of crops such as root knot nematodes (*Meloidogyne sp*) and root lesion nematodes (*Protylenchus sp*); insects eating roots of crops and fruit trees such as larvae of moth (Lepidoptera) and larvae of scarab beetle (Coleoptera); insects being parasitic on roots such as larvae of cicada, striped flea beetle (*Rhyllotreta striolata*), weevil (*Sphenophorus venatus*), rice root aphid (*Rhopalosiphum rufiabdominalis, Anoecia fulviabdominalis, Tetraneura nigriabdominalis*), scarab beetle (Coleoptera) and ant; soil pathogenic fungi causing soil diseases such as Pythium, Fusarium, Rhizoctonia and Verticillium; moles, myriapods (Dipropoda) (e.g., pill bug (Armadillidae), millipede (Nematomorpha)), and terrestrial molluscs (e.g., slug, siebold's globular snail (*Acusta despecta*)) damaging lawns and fields; and *Pomacea caniliculata* (pond snail) inhabiting paddy fields and irrigation canals therearound. The method of the present invention is usable not only in controlling soil pests damaging crops but also in exterminating general pests. For example, *Mytilus sp* and so on adhering to drainage pipes can be exterminated by passing the oxygen-removed water or the non-oxygen gas-supersaturated water onto the surface of the drainage pipes.

The crops to be treated by the method of the present invention are not particularly restricted. Examples thereof include fruit trees such as apple, grape, orange, peach and persimmon trees, fruit vegetables such as tomato, water melon and melon, leaf vegetables such as spinach, komatsuna (*Brassica campestris*), cabbage and lettuce, potatoes such as sweet potato, minor crops such as beet and cane and root vegetables such as carrot and Japanese radish. They further involve lawn, garden plants and forest plants.

Although the mechanism for extermination of soil pests by irrigating the soil with the oxygen-removed water or the non-oxygen gas has not been clarified yet in detail, it is assumed that the irrigation temporarily lowers the oxygen concentration at the habitat of the pests and thus the pests die from suffocation or escape from the habitat.

When the oxygen-removed water is used, the oxygen-removed water absorbs a large amount of oxygen gas contained in the soil, compared with nitrogen gas, and thus the oxygen concentration in the soil is reduced. Thus the oxygen level in the soil is lowered. It is also estimated that the oxygen-removed water absorbs bubbles and seals spiracles of insects, thus causing suffocation.

When the soil is irrigated with the non-oxygen gas-supersaturated water under atmospheric pressure, the supersaturated gas diffuses off from the water and the gas is generated. The concentration of oxygen contained in the evolving gas is frequently lower than the composition ratio of oxygen dissolved in the non-oxygen gas-supersaturated water, though it varies depending on, for example, the composition of the gases dissolved in the non-oxygen gas-supersaturated water, pressure, temperature and pH value of the soil. When the soil is irrigated with the non-oxygen gas-supersaturated water of the present invention, therefore, the oxygen concentration in the soil becomes lower than the oxygen concentration in the air. Since the gas evolving from the non-oxygen gas-supersaturated water diffuses into the soil, a low oxygen level is achieved over a wider range than the irrigated area. It is still preferable to use non-oxygen gas-supersaturated water with a dissolved oxygen concentration of 9 ppm or less. This is because the water absorbs oxygen in the soil and thus the oxygen gas concentration in the soil is further lowered in this case. It is assumed that in the case of water supersaturated with carbon dioxide gas, in particular, pests are anesthetized due to the anesthetic action of the carbon dioxide gas and die from suffocation.

To lower the oxygen concentration in the soil, a gaseous non-oxygen gas may be directly introduced into the soil. However, this method can achieve only a poor efficiency, since the major part of the applied is scattered into the atmosphere through shorted pathway. In the case of the non-oxygen gas-supersaturated water, on the other hand, the gas dissolved therein is scattered into the atmosphere very slowly, compared with the gaseous non-oxygen gas and therefore the non-oxygen gas is liberated after penetrating into every corner. Thus the oxygen concentration in the soil is uniformly reduced and a low oxygen level can be maintained around the root system of a crop for a prolonged period of time, thus achieving a high efficiency.

According to the present invention, furthermore, the contents of water-soluble components of a crop can be increased and thus a high-quality crop can be produced by irrigating the soil with the oxygen-removed water or the non-oxygen gas-supersaturated water to thereby establish a low oxygen level around the root system of the crop.

The term "crop" employed herein has been already described above. When aiming at increasing the contents of water-soluble components of a crop, the method of the present invention is particularly suitable for fruit vegetables with a long harvesting time.

The high-quality crop produced by the method of the present invention is one which is rich in useful, water-soluble components in the edible part and has a good taste, a high nutritive value, a desirable color and a desirable shape. In the case of tomato, for example, those which are rich in vitamin C and citric acid and excellent in color and shape can be produced. In the case of fruit trees such as orange and apple trees, delicious fruits can be obtained. Examples of the useful, water-soluble components include sugars, organic acids such as citric acid, vitamins such as vitamin B complexes and vitamin C and minerals.

The expression "to establish a low oxygen level around the root system of a crop" means to make the oxygen concentration around the roots of the crop to be treated lower than the ordinary oxygen concentration. Although the mechanism thereof has not been clarified yet, it is assumed that the low oxygen level around the root system loads a stress to the roots and suppresses the water absorption, thus promoting accumulation of the water-soluble components in the edible part.

Now the irrigation of the soil with the oxygen-removed water or the non-oxygen gas-supersaturated water will be illustrated.

The term "irrigation" as used herein means to supply the soil with water. The term "soil" as used herein involves not only cultivated areas such as fields but also those in planters and flower pots and growth beds (for example, rock wool, vermiculite) wherein crops are grown.

In the present invention, the soil may be irrigated with the oxygen-removed water or the non-oxygen gas-supersaturated water by, for example, aerial application, irrigation onto the soil surface (the surface of the earth) or drench into the soil. Among these means, the drench into the soil is the most preferable one followed by the irrigation onto the soil surface from the viewpoints of preventing deterioration of the effects of the present invention due to redissolution of the atmospheric air into the oxygen-removed water or diffusion of the non-oxygen gas into the atmosphere from the non-oxygen gas-supersaturated water, and saving the irrigation water. In the case of protected cultivation with use of, for example, vinyl houses, wherein irrigation is performed to make up for lack of natural rainfall, it is considered that the drench into the soil is preferable for saving the amount of the irrigation water and suppressing damages caused by diseases. With regard to the irrigation in the method of the present invention, the drench into the soil is preferable for the same reasons as well as for the fact that the same equipment is usable therefor.

The irrigation onto the soil surface can be performed by, for example, laying a water-permeable pipe (spray tube) on the upper part of the soil and passing the oxygen-removed water or the non-oxygen gas-supersaturated water through the pipe. If such water can be supplied in a large amount, it may be simply poured onto the surface of the soil. The term "water-permeable pipe" as used herein means, for example, a porous rubber pipe, a perforated vinyl chloride pipe or a water-permeable unglazed ceramic pipe. It is preferable that the tube have pores of from 1 to 3 mm in size and distributed at a ratio of at least one/(5 to 10 cm$^2$), though these factors are not applied to a porous rubber.

It is further preferable that the irrigation is performed by coating the soil surface with a substantially air non-permeable sheet (mulching) and laying a water-permeable pipe therein. The term "substantially air non-permeable sheet" as used herein means a sheet showing an oxygen permeation rate of $3 \times 10^{-7}$ (cm$^3$/cm$^2$·s·cmHg) or less. Examples thereof include polyethylene films and films or sheets made of vinyl chloride.

The drench into the soil can be carried out by, for example, passing the oxygen-removed water or the non-oxygen gas-supersaturated water through a water-permeable pipe buried in the soil. The depth for burying the pipe may be appropriately determined based on the depth of the roots of the crop to be treated and the depth of the habitat of the pests to be exterminated. For example, the drench may be carried out by burying the pipe in the soil at a depth of from 20 to 100 cm, preferably from 30 to 50 cm. It is also possible to perform the drench via a number of pipes buried at various depths or to perform the irrigation onto the soil surface simultaneously therewith.

In the case of the irrigation onto the soil surface or drench into the soil, one or more pipes are preferably provided at intervals of 0.5 m. For saving the amount of irrigation water, it is recommended to provide a pipe at the center of each ridge, though it varies depending on the crop to be cultivated.

As described above, it is possible in the present invention to appropriately select the irrigation depth. Thus the irrigation can be performed depending on the root depth of a crop. According to the method of the present invention, therefore, nematodes can be easily exterminated in the case of a root vegetable with long roots such as great burdock or Japanese radish where nematodes are distributed in the depth sites of the soil and thus hardly exterminated by the conventional methods.

In the present invention, the amount of irrigation water varies depending on, for example, the irrigation method, the type and composition of the soil to be irrigated, the pests to be exterminated and the crop. In the case of the irrigation onto the soil surface, it is preferable to apply the water in an amount corresponding to a rainfall of from 20 to 300 mm, more preferably from 30 to 100 mm, each time. In the case of the drench into the soil, it is preferable to apply the water in an amount corresponding to a rainfall of from 10 to 100 mm, more preferably from 20 to 50 mm, and particularly preferably from 30 to 40 mm, each time. When the irrigation is performed prior to sowing or cropping, the amount of the water is not particularly restricted. However, the pest-exterminating effects cannot be improved any more by irrigating the soil with the water in an amount corresponding to a rainfall of 300 mm or more. It is therefore recommended to regulate the amount of the water to a level corresponding to a rainfall of 300 mm at the largest.

When the irrigation is performed after sowing or cropping, the amount of the irrigation water may be controlled depending on the crop. Namely, the irrigation water is used in a small amount for a crop requiring a relatively small amount of water (for example, tomato, melon) and in a large amount for a crop requiring a large amount of water (for example, cucumber, eggplant).

The irrigation with the oxygen-removed water or the non-oxygen gas-supersaturated water may be performed under an elevated pressure. Alternatively, it may be carried out by allowing the water to spontaneously run down from, for example, a tank without applying any elevated pressure.

The irrigation time varies depending on, for example, the irrigation method, the amount of the irrigation water, the irrigation timing, the type and composition of the soil to be irrigated and the area to be applied. To achieve a high efficiency, the irrigation or spraying onto the soil surface may be completed within such a period of time that the oxygen-removed water or non-oxygen gas-supersaturated water perfectly penetrates into the soil without overflowing onto the soil surface, namely preferably from 5 minutes to 6 hours, more preferably from 10 minutes to 1 hour, each time. The drench is completed preferably within from 0.5 to 48 hours, more preferably from 6 to 24 hours, each time.

In the case of the drench into the soil, it is particularly preferable that the application may be completed within 24 hours each time with the water in an amount corresponding to a rainfall of 30 to 40 mm.

The timing for the irrigation by the method of the present invention somewhat varies depending on the purpose of the application, namely, to exterminate pests inhabiting the soil or to elevate the contents of water-soluble components of a crop. In order to exterminate the pests inhabiting the soil, the irrigation may be carried out either prior to planting or sowing of the crop or during growth of the crop. It is also possible to employ both of them or to perform the application twice or more. Among all, it is preferable to perform the application twice or more prior to planting or sowing of the crop, since the density of pests can be preliminarily lowered and the environment for growth of the crop can be improved thereby. Furthermore, the application exerts no effect on the crop and thus it is not necessary to restrict the amount of the irrigation water or the irrigation frequency in this case. However, it is sometimes observed that the application prior to sowing or fielding cannot achieve any satisfactory effect. Therefore, it is preferable to perform the application after sowing or fielding too.

The irrigation frequency varies depending on, for example, the amount of the irrigation water each time, the irrigation timing, the target pest to be exterminated and the type and composition of the soil to be treated. It is preferable to perform the application once to three times in 7 to 60 days before sowing or fielding of the crop. Prior to sowing or planting of the crop, the irrigation can be carried out continuously. When the irrigation according to the method of the present invention is to be performed after sowing or fielding, extremely short intervals of the application would sometimes exert undesirable effects on the crop due to shortage of oxygen around the root system and, on the other hand, excessively long intervals of the application would induce multiplication of some pests such as nematodes and thus deteriorate the effects of the present invention. Therefore, it is preferable to perform the application once or more in 60 days, more preferably once in 20 to 40 days, and particularly preferably once in about 30 days. Alternatively, the application may be carried out not only regularly but also optionally while monitoring the appearance or growth of pests such as nematodes by, for example, sampling the soil. It is not necessary to irrigate the whole field each time. Namely, after irrigating the whole field once, the irrigation may be made only around the field so as to prevent invasion of pests.

In general, with regard to the timing, it is preferable to perform the irrigation during or immediately before active period of pests inhabiting the soil, namely, at the time of germination, root taking or elongation of the crop. In the case of the cultivation of tomato in a vinyl house, for example, the application may be preferably carried out in the following manner. Before planting tomato seedlings, the soil is drenched with the oxygen-removed water or the non-oxygen gas-supersaturated water from a spray tube, which has been buried at a depth of 30 cm underground, in an amount corresponding to a rainfall of 30 mm for 24 hours. After repeating this application twice at an interval of 7 days, the seedlings are planted. Subsequently, the soil is drenched with the water in an amount corresponding to a rainfall of 30 mm once in 30 days.

In order to elevate the contents of water-soluble components in a crop, the irrigation timing varies depending on, for example, the type of the crop. It is recommended to perform the irrigation at an appropriate point while monitoring the growth of the crop. In this case, it is preferable not to continuously maintain a low oxygen level in the soil but to perform the irrigation at intervals of from 10 to 15 days in general. It is preferable that the irrigation is performed during the period of the vigorous growth of the crop (i.e., just before the over-luxuriant growth time). In the case of a crop bearing fruits at each knot which has many harvesting times (for example, tomato), the application may be preferably performed at each harvesting time. It is also possible to further perform the application in 1 to 2 weeks before the harvesting.

During the irrigation process according to the present invention, it is also possible to irrigate the soil with the common water or the water supersaturated with oxygen so as to supply oxygen to the root system of the crop. Namely, the irrigation may be optionally carried out by taking the growth of the crop and the generation of pests into consideration.

The present invention is now illustrated in greater detail by way of the following examples, but it should be understood that the present invention is not to be deemed to be limited thereto.

PREPARATION EXAMPLE 1

Preparation of Oxygen-Removed Water

A membrane module (diameter: 11 cm, height 60 cm) shown in FIG. 1, which was packed with 50,000 of hollow fiber heterogenous membranes (outer diameter: 263 µm, inner diameter: 207 µm) made of poly-4-methylpentene-1, was prepared. Namely, the hollow fiber membranes bundled almost in parallel were loaded in module housing 2. Both ends of the hollow fiber membranes were sealed with a resin 3 (potting). At the end face 4 of each sealing part, openings of the inside of the hollow fiber membranes were provided. The module housing was equipped with end caps 5, a liquid inlet 6 connecting one end of the hollow fiber membranes to the inside of the same, a liquid outlet 7 connecting another end of the hollow fiber membranes to the inside of the same, and a vacuum connecting port 8 connecting the space adjoining the outside of the hollow fiber membranes. Tap water at 25° C. was introduced into the liquid inlet of the module at a rate of 10 l/min and the pressure at the vacuum connecting port was reduced to 35 torr with a hydraulic vacuum pump. When measured with a dissolved oxygen concentration meter (Model DOL-10, a product of Denki Kagaku Keiki Co., Ltd.), the dissolved oxygen concentration of the raw water fed into the module was 8.0 ppm, while the dissolved oxygen concentration of the oxygen-removed water discharged from the liquid outlet was 0.7 ppm (corresponding to 8.8% of the saturated dissolved oxygen concentration).

PREPARATION EXAMPLE 2

Preparation of Non-Oxygen Gas-Supersaturated Water

Figure 2:
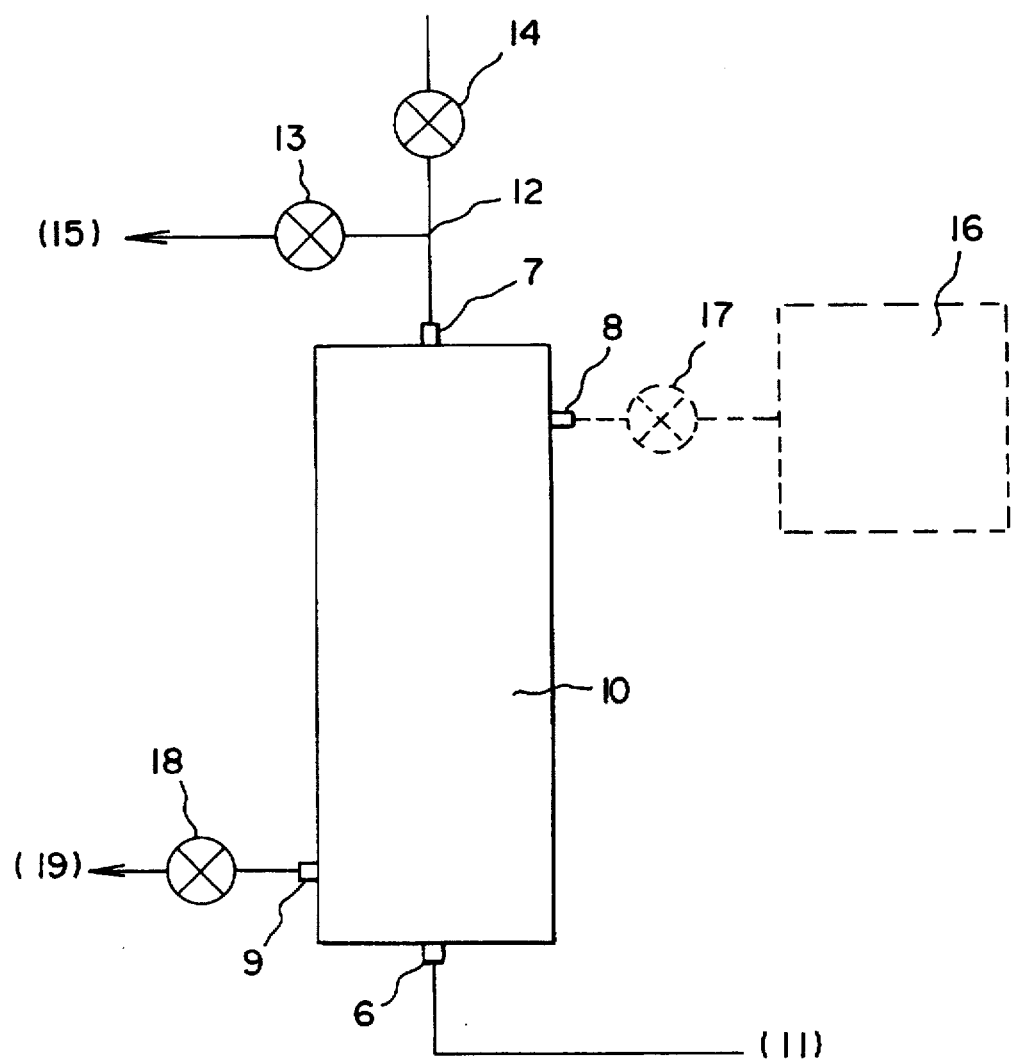
FIG. 2 shows a device for producing water supersaturated with a non-oxygen gas employed in Preparation Example 3.

Hollow fiber heterogenous membranes (outer diameter: 263 µm, inner diameter: 207 µm) made of poly-4-methylpentene-1 were prepared by the method described in Preparation Example 1 of JP-A-4-7078. Then a cylindrical membrane module 10 (diameter: 11 cm, height: 60 cm) packed with 50,000 of these hollow fiber membranes were prepared (see FIG. 1). Namely, the hollow fiber membranes 1 bundled almost in parallel were loaded in cylindrical module housing 2. Both ends of the hollow fiber membranes were sealed with a resin 3. At the end face 4 of each sealing part, openings of the inside of the hollow fiber membranes were provided. The module housing was equipped with end caps 5, a liquid inlet 6 connecting one end of the hollow fiber membranes to the inside of the same, a liquid outlet 7 connecting another end of the hollow fiber membranes to the inside of the same, a gas inlet 8 and a gas outlet 9 connecting to the space adjoining the outside of the hollow fiber membranes. This membrane module 10 was arranged as shown in FIG. 2. Namely, a device for producing low-oxygen air 16 was connected to the gas inlet 8 of the module via a pressure regulating valve 17. A leak valve 18 was connected to the gas outlet 9 of the membrane module 10. A branched pipe 12 was connected to the liquid outlet 7 of the membrane module 10 and a valve 13 for controlling the flow rate of non-oxygen gas-supersaturated water 15 was connected to one branch while a leak valve 14 was connected to another one. Thus a device for preparing non-oxygen gas-supersaturated water was formed.

Tap water at 20° C. (pressure: about 3 kgf/cm²G) was introduced, as raw water 11, into the liquid inlet 6 of the membrane module 10 of the above-mentioned device and the flow rate was adjusted to 10 l/min with the flow rate controlling valve 13 connected to the liquid outlet 7. On the other hand, carbon dioxide gas (pressure: 2 kgf/cm²G) was introduced into the gas inlet 8 from a gas cylinder, i.e., a device for producing low-oxygen air 16. Then about 10% of the carbon dioxide gas thus introduced was liberated as a leak gas 19 with the leak valve 18 connected to the gas outlet 9. In this step, the dissolved oxygen concentration, the dissolved nitrogen concentration and the dissolved carbon dioxide gas concentration of the raw water 11 flowing into the module were 9.0 ppm by weight, 17.8 ppm by weight and about 0.5 ppm by weight, respectively. On the other hand, the dissolved oxygen concentration, the dissolved nitrogen concentration and the dissolved carbon dioxide gas concentration of the non-oxygen gas-supersaturated water 15 discharged from the liquid outlet were respectively 5.4 ppm by weight, 10 ppm by weight and 1,300 ppm by weight. The molar fraction of the dissolved oxygen in the total gases dissolved in the non-oxygen gas-supersaturated water was 0.56%. The concentration of each dissolved gas was measured by gas chromatography.

PREPARATION EXAMPLE 3

Preparation of Non-Oxygen Gas-Supersaturated Water

Non-oxygen gas-supersaturated water was prepared in the same manner as in Preparation Example 2, except for using a membrane nitrogen condenser, by which a nitrogen-enriched air with a nitrogen concentration of 99% could be produced at a rate of 3.3 Nl/min (N means a value expressed on one atm basis), as a device for producing low-oxygen air 16, introducing the nitrogen-enriched air of a nitrogen concentration of 99% evolving from this membrane nitrogen condenser into the module 10 under a pressure of 3 kgf/cm², and discharging the whole excessive gas (i.e., the undissolved nitrogen-enriched gas fed into the module 10) as the leak gas 19 from the leak valve 18. Thus the non-oxygen gas-supersaturated water was prepared.

In this step, the dissolved oxygen concentration, the nitrogen concentration and the carbon dioxide gas concentration of the raw water 11 were 9.0 ppm by weight, 17.8 ppm by weight and 0.5 ppm by weight, respectively. On the other hand, the dissolved oxygen concentration, the dissolved nitrogen concentration and the dissolved carbon dioxide gas concentration of the non-oxygen gas-supersaturated water were 4.8 ppm by weight, 40 ppm by weight and 0.5 ppm by weight, respectively. The molar fraction of the dissolved oxygen in the total gases dissolved in the non-oxygen gas-supersaturated water was 9.4%. The concentration of each dissolved gas was measured by gas chromatography.

PREPARATION EXAMPLE 4

Preparation of Non-Oxygen Gas-Supersaturated Water

Figure 3:
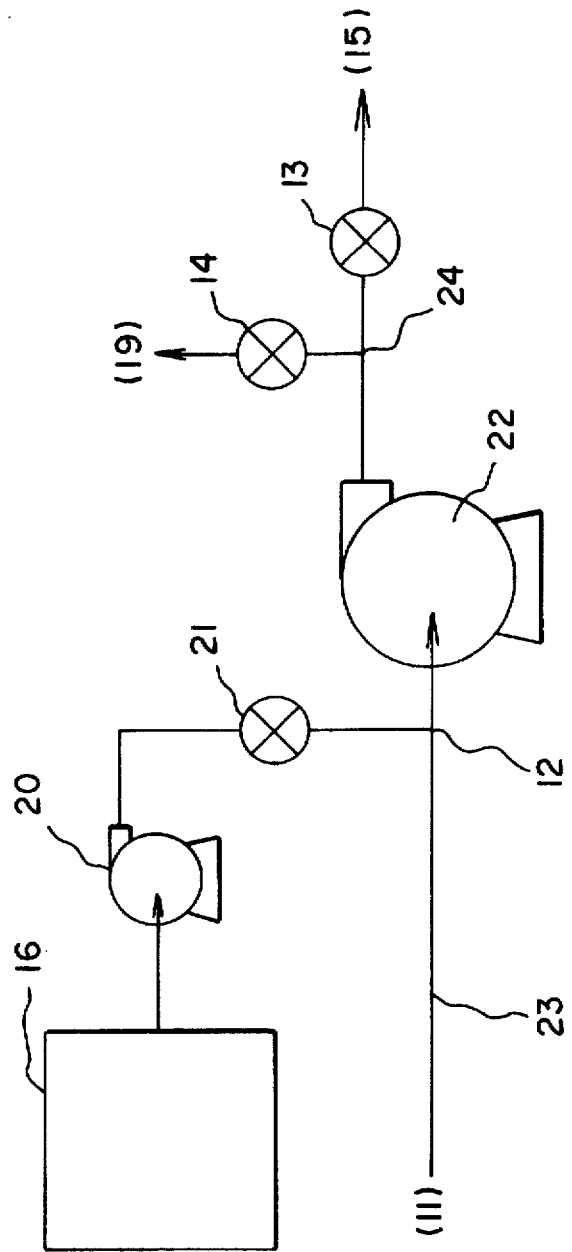
FIG. 3 shows a device for producing water supersaturated with a non-oxygen gas employed in Preparation Example 5.

FIG. 3 shows the device employed in this example. A volute pump (maximum pressure: 5 kgf/cm²G, discharge rate: 50 l/min) was used as a water pump 22, a kerosene-combustion inert gas generator was used as a device for producing low-oxygen air 16, and a diaphragm pump (exhaust rate: 3 Nl/min) was used as a gas pump 20 for the oxygen-removed air. These units were connected so as to introduce the oxygen-removed air evolving from the oxygen-removed air generator into immediately before the suction port of the water pump 22 via the gas pump 20 and the flow rate controlling valve 21. Raw water lead-in pipe 23 was connected to the suction port of the water pump 22. To the discharge side of the water pump 22, a branched pipe 24 was connected. A flow rate controlling valve 13 was connected to one branch, while a leak valve 14 for the excessive gas was connected to another branch. Thus a unit for preparing non-oxygen gas-supersaturated water was formed.

Raw water 11 at 20° C. was introduced into this unit by connecting a lead-in pipe for the raw water 23 at the suction port of the water pump to a water tank and the flow rate was adjusted to 10 l/min with the flow rate controlling valve 13 connected to the discharge side of the water pump 22. The flow rate of the water discharged together with the undissolved gas was controlled not to exceed 0.3 l/min by the leak valve 14 connected to the discharge side of the water pump 22. On the other hand, the flow rate of the oxygen-removed air was adjusted to about 2 Nl/min with the flow rate controlling valve 21 connected to the gas pump 20.

In this step, the dissolved oxygen concentration, the nitrogen concentration and the carbon dioxide gas concentration of the raw water 11 were 9.2 ppm by weight, 18.0 ppm by weight and 0.6 ppm by weight, respectively. On the other hand, the dissolved oxygen concentration, the dissolved nitrogen concentration and the dissolved carbon dioxide gas concentration of the non-oxygen gas-supersaturated water 15 were 3.8 ppm by weight, 35 ppm by weight and 220 ppm by weight, respectively. The molar fraction of the dissolved oxygen in the total gases dissolved in the non-oxygen gas-supersaturated water was 1.9%. The concentration of each dissolved gas was measured by gas chromatography.

PREPARATION EXAMPLE 5

Preparation of Non-Oxygen Gas-Supersaturated Water

Non-oxygen gas-supersaturated water was prepared in the same manner as in Preparation Example 2, except for discharging 60% of the carbon dioxide gas fed into the module with the leak valve connected to the gas outlet. In this step, the dissolved oxygen concentration, the nitrogen concentration and the carbon dioxide gas concentration of the raw water flowing into the module were 9.2 ppm by weight, 18.0 ppm by weight and 0.6 ppm by weight, respectively. On the other hand, the dissolved oxygen concentration, the nitrogen concentration and the carbon dioxide gas concentration of the non-oxygen gas-supersaturated water discharged from the liquid outlet were 5.4 ppm by weight, 10 ppm by weight and 1,300 ppm by weight, respectively. The molar fraction of the dissolved oxygen in the total gases dissolved in the non-oxygen gas-supersaturated water was 0.57%. The concentration of each dissolved gas was measured by gas chromatography.

PREPARATION EXAMPLE 6

Preparation of Non-Oxygen Gas-Supersaturated Water

Non-oxygen gas-supersaturated water was prepared in the same manner as in Preparation Example 2, except for introducing nitrogen of a pressure of 3 kgf/cm$^2$G in place of the carbon dioxide gas. In this step, the dissolved oxygen concentration, the nitrogen concentration and the carbon dioxide gas concentration of the raw water flowing into the module were 9.2 ppm by weight, 18.0 ppm by weight and 0.6 ppm by weight, respectively. On the other hand, the dissolved oxygen concentration, the nitrogen concentration and the carbon dioxide gas concentration of the non-oxygen gas-supersaturated water discharged from the liquid outlet were 4.8 ppm by weight, 40 ppm by weight and 0.5 ppm by weight, respectively. The molar fraction of the dissolved oxygen in the total gases dissolved in the non-oxygen gas-supersaturated water was 10.4%. The concentration of each dissolved gas was measured by gas chromatography.

PREPARATION EXAMPLE 7

Preparation of Non-Oxygen Gas-Supersaturated Water

Two membrane modules 10 being the same as in Preparation Example 5 were formed. Tap water at 20° C. was introduced into the liquid inlet of the first module and the liquid outlet of the first module was connected to the liquid inlet of the second module with a pipe. Thus the water discharged from the first module was directly introduced into the second module without coming in contact with air. The flow rate was adjusted to 10 l/min with the flow rate controlling valve connected to the liquid outlet of the second module. On the other hand, the gas inlet and the gas outlet of the first module were connected to a hydraulic vacuum pump and the pressure was reduced to 35 torr. Into the gas inlet of the second module, carbon dioxide gas of a pressure of 1 kgf/cm$^2$G was introduced and the leak valve connected to the gas outlet was completely closed. In this step, the dissolved oxygen concentration, the nitrogen concentration and the carbon dioxide gas concentration of the raw water flowing into the first module were 9.2 ppm by weight, 18.0 ppm by weight and 0.6 ppm by weight, respectively. On the other hand, the dissolved oxygen concentration, the nitrogen concentration and the carbon dioxide gas concentration of the water discharged from the liquid outlet of the second module were 0.9 ppm by weight, about 2 ppm by weight and 700 ppm by weight, respectively. The molar fraction of the dissolved oxygen in the total gases dissolved in the water was 0.18%. The dissolved oxygen concentration and the nitrogen concentration of the water discharged from the first module were 0.9 ppm by weight and about 2 ppm by weight, respectively, while the carbon dioxide gas concentration thereof was lower then the detection limit. The dissolved nitrogen concentration and the dissolved carbon dioxide gas concentration were each measured by gas chromatography and the dissolved oxygen concentration was measured with a dissolved oxygen concentration meter of the Galvanic cell type.

EXAMPLE 1

Test on extermination of southern root knot nematode (sweet potato root knot nematode) (*Maloidogyne incognita*) with oxygen-removed water:

Soil contaminated with southern root knot nematode obtained from a tomato-replanting field was fed into planters (length: 50 cm, width: 18 cm, depth: 20 cm). Prior to the treatment, a pipe made of hard vinyl chloride (inner diameter: 13 mm) (hereinafter referred to simply as vinyl chloride pipe) was buried at the center of the bottom of each planter. This pipe was perforated at intervals of 1 cm with a drill of 2 mm. One end of the pipe was sealed, while another end was stuck out of the soil by an L-type pipe so as to allow water supply.

The oxygen-removed water was applied in the following manner. Namely, the oxygen-removed water prepared in Preparation Example 1 was fed into a 20 l polyethylene tank having an opening at the bottom. This tank was connected to the upper end of the L-type pipe via a hose. Then the soil in the above-mentioned planter was irrigated by spontaneous drenching into the soil. The irrigation was ceased when the water flew out from an overflow at the bottom of the planter (corresponding to a rainfall of about 100 mm). The same application with oxygen-removed water was repeated twice at intervals of 5 days. Next, the soil, which had been previously disinfected with methyl bromide, was introduced into a sowing bed and seeded with tomato (variety: Fukuju). After 3 weeks, 4 tomato seedlings were transplanted into each planter. The seedlings were transplanted on the 7th day after the application of the oxygen-removed water. These planters were referred to as a treatment lot.

The above-mentioned procedure was repeated, except for using tap water in place of the oxygen-removed water. These planters were referred to as a control lot.

The test was effected in 3-runs for each lot. During the test period, tap water was supplied by the spontaneous running down subsurface drenching system.

The planters were located on seedling-raising shelves in a glass greenhouse. On the 36th day after the transplantation, all individuals were dug up and the roots were washed with water. Then each individual was evaluated in the degree of parasitism of root knots in 5 grades (0 to 4) as specified in Table 1. The root knot index was then calculated in accordance with the following formula 1. Also, nematodes in the soil were separated by the Bermann funnel technique and those at the second instar were counted, and the results obtained are shown in Table 2.

TABLE 1

| Degree of parasitism | Formation of root knots |
|---|---|
| 0 | No root knot is observed in the entire root system. |
| 1 | Few root knots are observed. |
| 2 | Root knots are formed at a moderate level. |
| 3 | Many root knots are formed. |
| 4 | Extremely many root knots of a large size are formed. |

$$\text{Root knot index} = \frac{(1 \times A) + (2 \times B) + (3 \times C) + (4 \times D)}{4 \times N} \times 100 \quad \text{(Formula 1)}$$

wherein A stands for the number of stubs showing a degree of parasitism of 1; B stands for the number of stubs showing a degree of parasitism of 2; C stands for the number of stubs showing a degree of parasitism of 3; D stands for the number of stubs showing a degree of parasitism of 4; and N stands for the total number of the stubs examined.

TABLE 2

| | Number of nematodes | | |
|---|---|---|---|
| Lot | Before application | At digging up | Root knot index |
| Treatment | 61 | 0 | 0 |
| Control | 61 | 142 | 32.4 |

Note: The number of nematodes is expressed in the number of larvae at the second instar per 20 g of the soil (average of 3 runs determined by the Bermann funnel technique).

EXAMPLE 2

Test on extermination of southern root knot nematode (*Maloidogyne incognita*) with non-oxygen gas-supersaturated water:

Overflows at the bottom of Wagner pots (1/5000a) were sealed each with a rubber plug. Then a soil contaminated with southern root-knot nematode obtained from a tomato-replanting field was fed into these pots. After applying the non-oxygen gas-supersaturated waters obtained in Preparation Examples 2 to 4 so as to achieve overhead flooding, these pots were allowed to stand for 24 hours. Subsequently, the water was discharged by taking off the rubber plug from each overflow.

After 7 days, the soil was seeded with garden balsam (*Impatiens balsamina*) followed by usual cultivation performance in a greenhouse. Each treatment lot had 4 pots and each pot had 10 seeds. On the 60th day after sowing, the garden balsam plants were dug up and the roots were washed with water. Then each individual was examined in the degree of parasitism of root knots in the same manner as in Example 1 and the root knot index was calculated. The results obtained are shown in Table 3 below.

TABLE 3

| Water | Root knot index |
| --- | --- |
| Preparation Example 2 | 0 |
| Preparation Example 3 | 12.5 |
| Preparation Example 4 | 0 |
| Control (tap water) | 84.4 |

EXAMPLE 3

Test on extermination of carrot root knot nematode with oxygen-removed water:

In a greenhouse, a growth bed (width: 90 cm, length: 20 cm) was formed and soil irrigation pipes made of porous rubber (Leaky Pipe™; a product of NIPPON SANSO CORPORATION) were buried lengthwise at a depth of 40 cm and at intervals of 30 cm. Then the oxygen-removed water prepared in Preparation Example 4 was poured into the soil from the irrigation tubes via a flow rate meter. The irrigation water was used in an amount corresponding to a rainfall of 30 mm in 24 hours. This application with the oxygen-removed water was repeated twice at an interval of 5 days. After 7 days, the soil was seeded with carrot followed by conventional cultivation. During the cultivation period, tap water was supplied by drenching into the soil. Carrots were harvested on the 140th to 142nd days after sowing. This performance was referred to as a treatment lot.

The above procedure was repeated, except for using tap water in place of the oxygen-removed water. This performance was referred to as a control lot. The results of the cultivation obtained are shown in Table 4 (variety of carrot: Kuroda Gosun, manuring practice: conventional way, lot: 18 m²/lot, 2-runs).

The soil was sampled from 3 sites (depth: 20 cm) before and after the treatment with the oxygen-removed water and at the harvesting and root knot nematodes per 100 g of the soil were counted by the Bermann funnel technique. At the harvesting, the roots were evaluated in damage and the ratio of damaged roots was calculated in accordance with the following formula 2. The ratio of damaged roots was examined in 2 areas (each having 200 plants) per lot and the results were expressed in the average of the 2 area. The results obtained are shown in Table 4 below.

$$\text{Ratio of damaged roots (\%)} = \frac{\text{Number of carrots with damaged roots}}{\text{Number of all carrots examined (200 plants)}} \times 100 \quad \text{(Formula 2)}$$

TABLE 4

| Lot | Root-knot nematode density (number/100 g) | | | Ratio of damaged roots (%) |
| --- | --- | --- | --- | --- |
| | Before treatment | After treatment | At harvesting | |
| Treatment | 155.7 | 2.2 | 298.7 | 3.0 |
| Control | 80.3 | 156.3 | 1306.3 | 20.5 |

EXAMPLE 4

Test on extermination of larvae of scarab beetle (Coleoptera) with oxygen-removed water:

A bent grass lawn (nursery) of 600 m² (20 m×30 m), in which leaky pipes had been buried at a depth of 40 cm, was formed and provided with a water supply and discharge valve per 200 m² (20 m×10 m) by which water could be supplied independently. Two years after formation of the lawn, it was confirmed that scarab beetles inhabited the lawn. Thus the test was initiated.

The following 3 lots each 200 m² in area were employed: (1) the soil was drenched with oxygen-removed water of a dissolved oxygen concentration of 0.5 ppm (corresponding to 5.6% of the saturated dissolved oxygen concentration) via irrigation tubes (oxygen-removed water treatment lot); (2) the soil was drenched with tap water via irrigation tubes (tap water treatment lot); and (3) tap water was sprayed onto the soil surface (control lot). The irrigation water was used in an amount corresponding to a rainfall of 30 mm each time. The application was performed three times at intervals of 3 days.

On the 14th day after the final irrigation, the soil was dug in 3 sites (40 cm×40 cm, depth: 40 cm) at which the leaky pipes were buried and larvae of scarab beetle inhabiting therein were counted. Then the extermination ratio was calculated in accordance with the following formula 3. The extermination ratio was expressed in the average of 3 sites. The results obtained are shown in Table 5 below.

TABLE 5

| Lot | Number of alive larvae | Extermination ratio (%) |
| --- | --- | --- |
| Oxygen reduced water treatment | 4.7 | 78.9 |
| Tap water treatment | 21.3 | 4.5 |
| Control (surface irrigation) | 22.3 | — |

$$\text{Extermination ratio (\%)} = \frac{\text{Number of alive larvae in control lot} - \text{Number of alive larvae in test lot}}{\text{Number of alive larvae in control lot}} \times 100 \quad \text{(Formula 3)}$$

EXAMPLE 5

Test on extermination of larvae of scarab beetle with non-oxygen gas-supersaturated water:

Larvae of scarab beetle collected in a sweet potato field were fed in planters containing the soil of the same field (20 insects per planter). After 3 days for acclimation, various kinds of non-oxygen gas-supersaturated water were applied thereto. The planters employed in this test were 50 cm in length, 18 cm in width and 20 cm in depth. A pipe made of hard vinyl chloride (inner diameter: 13 mm) (hereinafter referred to simply as vinyl chloride pipe) was buried at a depth of 10 cm at the center of the bottom of each planter. This pipe was perforated at intervals of 1 cm with a drill of 2 mm. One end of the pipe was sealed, while another end was stuck out of the soil by an L-type pipe so as to allow water supply. The water to be applied was fed into a 20 l polyethylene tank having an opening at the bottom. This tank was connected to the upper end of the L-type pipe via a hose. Then the soil in the above-mentioned planter was irrigated by spontaneous drenching into the soil. The irrigation was ceased when the water flew out from an overflow at the bottom of the planter (corresponding to a rainfall of about 100 mm). The upper face of the planter was coated with a polyethylene film. On the 5th day after the application of the non-oxygen gas-supersaturated water, the dead and alive larvae scarab beetle were counted.

The survey was made by washing the whole soil in the planter with water followed by examination of life or death of the larvae. For comparison, a control lot, wherein the above procedure was repeated but using distilled water, and an untreated lot, wherein no water was used, were also examined. Each lot had 3 planters and the results were expressed in the average. The results obtained are shown in Table 6 below.

TABLE 6

| Lot | Number of larvae tested | Number of alive larvae | Number of dead larvae | Ratio of dead insects (%) |
|---|---|---|---|---|
| Water of Preparation Example 2 | 20 | 0.0 | 20.0 | 100 |
| Water of Preparation Example 3 | 20 | 0.0 | 20.0 | 100 |
| Water of Preparation Example 4 | 20 | 0.0 | 20.0 | 100 |
| Water of Preparation Example 5 | 20 | 0.0 | 20.0 | 100 |
| Water of Preparation Example 6 | 20 | 0.0 | 20.0 | 100 |
| Water of Preparation Example 7 | 20 | 0.0 | 20.0 | 100 |
| Control (distilled water) | 20 | 18.5 | 1.5 | 7.5 |
| Untreated | 20 | 20.0 | 0.0 | 0 |

EXAMPLE 6

Test on extermination of moles with oxygen-removed water:

The area employed in Example 4 (i.e., the test on the extermination of larvae scarab beetle) also suffered from the invasion of moles. Thus a test for the extermination of moles was performed at the same time.

After effecting the same applications as in Example 4, the mole-invasion frequency was determined on the basis of traces from immediately after completion of the final application to the 20th day. The results obtained are shown in Table 7 below.

TABLE 7

| Lot | Mole-invasion frequency till the 20th day |
|---|---|
| Oxygen-removed water treatment | 2 |
| Tap water treatment | 12 |
| Control (surface irrigation) | 14 |

EXAMPLE 7

Test of controlling cucumber damping-off (Pythium debaryanum) with non-oxygen gas-supersaturated water:

In a greenhouse, a test of controlling cucumber damping-off was effected by supplying a rock wool cultivation bed, which was unusable due to the occurrence of cucumber damping-off, with the water supersaturated with carbon dioxide gas of Preparation Example 5 and tap water (employed as a control) in place of hydroponic water. The upper face of the rock wool was provided with spray tubes by which the hydroponic water was supplied. The whole bed was coated with a silver polyethylene sheet. The water was discharged from a drain, but not recycled.

Each water was supplied at a rate of 180 l/hr for 6 hours per day for 2 days. After 7 days, cucumber seedlings were set. Ten days after setting, seedlings suffering from damping-off were counted. The results obtained are shown in Table 8 below.

TABLE 8

| | Cucumber variety: Nankyoku No. 2 | | | |
|---|---|---|---|---|
| | Number of seedlings with damping-off | | | |
| | Before application | | After application | |
| Lot | Number | % | Number | % |
| Carbon dioxide-supersaturated water treatment | 32 | 100 | 0 | 0 |
| Control (tap water) | 32 | 100 | 32 | 100 |

REFERENTIAL EXAMPLE 1

Nematocidal test with non-oxygen gas-supersaturated water:

A pasteurized soil was fed into a Wagner pot (1/5000a) and 3 g of a compound fertilizer (N10-P10-K10) was thoroughly mixed therewith. Then sweet potato seedlings (variety: Beniazuma) parasitized with southern root knot nematode was planted. After allowing the nematode to sufficiently multiply, the stubs were taken out and egg-batches were collected. A glass vial was connected to the bottom of a Bermann funnel and the egg-batches collected from the roots were wrapped with a double layer of gauze and introduced into the vial. Then the vial was filled with water and allowed to stand in a thermostat at 25° C. for 48 hours to thereby allow the nematode eggs to hatch.

A glass funnel (diameter: 9 cm) was filled with each of the non-oxygen gas-supersaturated water prepared in Preparation Examples 2 to 7 and a glass vial was connected to the bottom of the funnel. Then the nematode larvae hatching in the above device were dropped thereinto with a micropipet. The upper face of the funnel was coated with Saran Wrap (produced by Asahi Chemical Industry Co., Ltd.). After allowing to stand at room temperature for 24 hours, the alive and dead nematodes precipitated in the vial were counted. The results obtained are shown in Table 9 below.

TABLE 9

| Water | Number of nematodes | Alive | Dead | Extermination ratio (%) |
|---|---|---|---|---|
| Preparation Example 2 | 154 | 0 | 154 | 100 |
| Preparation Example 3 | 132 | 6 | 126 | 95.4 |
| Preparation Example 4 | 145 | 0 | 145 | 100 |
| Preparation Example 5 | 186 | 0 | 186 | 100 |
| Preparation Example 6 | 151 | 2 | 149 | 98.7 |
| Preparation Example 7 | 164 | 0 | 164 | 100 |
| Control (distilled water) | 173 | 169 | 4 | 2.3 |

REFERENTIAL EXAMPLE 2

Test on extermination of slugs with non-oxygen gas-supersaturated water:

A test was effected by collecting Slugs from Chinese cabbage (*Brassica pekinensis*) (variety: Fukufu) grown in a pipe house.

Two hundred ml portions of the water obtained in Preparation Examples 2 to 4 were introduced into high-walled Petri dishes (diameter: 9 cm) and the above-mentioned slugs were introduced thereinto (10 slugs per dish). The top of each dish was covered with a Petri dish of the same type. The examination was performed after 3 hours. The results obtained are shown in Table 10.

TABLE 10

| Water | Alive | Dead | Extermination ratio (%) |
|---|---|---|---|
| Preparation Example 2 | 0 | 10.0 | 100 |
| Preparation Example 3 | 0.5 | 9.5 | 95 |
| Preparation Example 4 | 0 | 10.0 | 100 |
| Control (distilled water) | 10 | 0 | 0 |

EXAMPLE 8

Test on application of oxygen-removed water to semi-forcing culture of watermelon:

(1) Growth bed and underground installation of pipe for application of oxygen-removed water:

Two line growth beds (width: 1 m, length: 40 m) were formed in a pipe house (width: 4.4 m, length: 40 m) and Leaky Pipe was buried (depth: 40 cm) at the center of each bed.

(2) Field husbandry of watermelon plant:

Fertilizer: 40 kg of organic fertilizer (N7: P17: K5), 80 kg of superphosphate, 60 kg of fused magnesium phosphate and 20 kg of potassium sulfate per 10 a (ares).

Variety: Ichio.

Cultivation: Watermelon plants grafted onto a gourd trellis were set at intervals of 40 cm in accordance with a conventional method and grown in the two-branch-one-fruit system. Mating was performed for 5 days. The term of from mating to harvesting required 50 to 54 days. The cultivation was carried out in a conventional manner, except for applying the following oxygen-removed water.

(3) Application of oxygen-removed water:

The application of the oxygen-removed water was effected by introducing the oxygen-removed water obtained in Preparation Example 1 into Leaky Pipe via a strainer and a flow rate meter and then drenching the soil therewith. The irrigation was performed twice, i.e., in the fruit thickening period (20 to 24 days after mating) and 10 to 14 days before harvesting. The irrigation water was each used in an amount corresponding to a rainfall of 30 mm in 24 hours.

(4) Measurement of sugar content:

Watermelons harvested on a definite day were halved lengthwise and samples collected from the center, peripheral and intermediate sites were evaluated in sugar content (Brix %) with a refractive saccharimeter. Table 11 shows the results expressed in the average of 5 watermelons.

For comparison, the above-procedure was repeated, except for using tap water in place of the oxygen-removed water, and the sugar content was determined. Table 11 shows the results expressed in the average of 5 watermelons.

In both of the oxygen-removed water treatment and control lots, one watermelon per stub was collected (i.e., 10 watermelons in total for each lot). These watermelons were regular in size, number and weight. With regard to the appearance, no abnormality was observed in gloss and shape.

TABLE 11

Determination of sugar content (Brix %) of watermelon obtained by semi-forcing cultivation

| Lot | Center | Intermediate | Peripheral |
|---|---|---|---|
| Treatment | 12.9 | 11.7 | 10.0 |
| Control | 11.5 | 10.0 | 8.9 |

EXAMPLE 9

Test on extermination of root knot nematode in plastic house cultivation of tomato:

A test was performed by using a plastic house where root-knot nematodes appeared very frequently. A porous rubber pipe (Leaky Pipe™) was buried (depth: 40 cm) in a ridge for cultivating tomato seedlings. After cultivating and fertilizing in a conventional manner, the soil was subsurface-drenched with the oxygen-removed water once before setting the tomato seedlings and then 4 times at intervals of 2 weeks thereafter. The irrigation water was used in an amount corresponding to a rainfall of 30 mm each time.

The cultivation was managed under the same conditions as those employed for the control lot (i.e. the conventional irrigation onto the surface). Then the yield throughout the cultivation period (Table 12) and the degree of parasitism of root knots after the completion of the cultivation (Table 13) were examined.

The degree of the parasitism of root knots was calculated in accordance with the following Table 14 and Formula 4.

| 1. | Control lot (1): | irrigation onto the soil surface. |
| 2. | Control lot (2): | drench into the soil with tap water (DO value*: about 8 ppm). |
| 3. | Treatment lot: | irrigation with oxygen-removed water (DO value: 0.6–0.3 ppm). |

[Note] DO value*: dissolved oxygen-removed water value.

TABLE 12

| Lot | Yield of tomato (kg/10 tubs) |
| --- | --- |
| Control (1) | 14.1 |
| Control (2) | 8.8 |
| Treatment | 16.0 |

TABLE 13

| Lot | Stub Numbers | \multicolumn{6}{c}{Damaged stub numbers} | Injury ratio (%) |
| --- | --- | --- | --- | --- | --- | --- | --- | --- |
|  |  | 0 | 1 | 2 | 3 | 4 | 5 |  |
| Control (1) | 10 | 0 | 1 | 3 | 4 | 1 | 1 | 56 |
| Control (2) | 10 | 0 | 0 | 1 | 3 | 4 | 2 | 74 |
| Treatment | 10 | 0 | 4 | 5 | 1 | 0 | 0 | 34 |

TABLE 14

| Root knot degree | Formation of root knots |
| --- | --- |
| 0 | No root knot is observed in the entire root system. |
| 1 | Few root knots are observed. |
| 2 | Root knots are formed at a moderate level. |
| 3 | Many root knots are formed. |
| 4 | Many root knots of a large size are formed. |
| 5 | Extremely many root knots of a larger size are formed. |

$$\text{Injury ratio} = \frac{(1 \times A) + (2 \times B) + (3 \times C) + (4 \times D) + (5 \times E)}{5 \times N} \times 100 \quad \text{(Formula 4)}$$

wherein A stands for the number of stubs showing a root knot degree of 1; B stands for the number of stubs showing a root knot degree of 2; C stands for the number of stubs showing a root knot degree of 3; D stands for the number of stubs showing a root knot degree of 4; E stands for the root knot degree of 5; and N stands for the total number of the stubs examined.

According to the present invention, damages on a crop caused by pests inhabiting the soil can be prevented and thus the crop can be normally grown. The present invention also makes it possible to provide highly safe crops grown with use of insecticides in a reduced amount or without using any insecticide in the fields of, for example, agriculture, fruit gardening, forestry and horticulture. Further, the present invention makes it possible to elevate the contents of water-soluble components in the edible part of a crop. Thus a high-quality crop can be easily produced without reducing the yield or harming the appearance.

The method of the present invention can be easily performed simply by irrigating the soil with oxygen-removed water or non-oxygen gas-supersaturated water at an adequate timing depending on the growth of the crop or the occurrence of pest damage. Thus it can be easily managed. In addition, this method is highly effective and cost-saving, since a device for the irrigation with oxygen-removed water or non-oxygen gas-supersaturated water (for example, water-permeable pipes buried in the soil) is also usable in usual irrigation, fertilization with water-soluble fertilizers, or supply of oxygen-enriched water. Furthermore, the irrigation depth can be arbitrarily selected. Therefore, means for reducing the pesticide level or controlling pests can be selected over a wide range by, for example, effecting the method of the present invention at a deeper part and applying a conventional chemical means at a subsurface part so as to exterminate pests.

While the invention has been described in detail and with reference to specific embodiments thereof, it will be apparent to one skilled in the art that various changes and modifications can be made therein without departing from the spirit and scope thereof.

What is claimed is:

1. A method for producing a crop, which comprises irrigating soil in which said crop is grown with oxygen-depleted water having a dissolved oxygen concentration of from 0.01 to 5 ppm for a time sufficient to exterminate pests in said soil, and then interrupting said irrigating step so that the oxygen content in the soil is at least partially restored.

2. A method as in claim 1, wherein the soil is irrigated with said oxygen-depleted water prior to planting of the crop.

3. The method of claim 1, wherein the soil is irrigated with said oxygen-depleted water periodically during the time in which the crop is grown in the soil.

4. The method of claim 1, wherein the soil is irrigated with said oxygen-depleted water at the time of germination, root taking and root elongation of said crop.

5. The method of claim 1, wherein said oxygen-depleted water is obtained by subjecting water to a degassing treatment using a hollow fiber membrane.

6. The method of claim 1, wherein the surface of the soil is covered with a substantially air impermeable sheet during said irrigating step.

7. The method of claim 1, wherein the soil is irrigated with said oxygen-depleted water every 12–15 days during the period of vigorous growth of the crop, whereby the water-soluble content of said crop is increased.

8. The method of claim 7, wherein said irrigating step is also carried out 1–2 weeks before harvesting of the crop, whereby the water soluble content of said crop is increased.

9. A method for producing a crop, which comprises irrigating soil in which said crop is grown with water obtained by dissolving nitrogen gas to a concentration of from 20 to 150 ppm in oxygen-depleted water having a dissolved oxygen concentration of not more than 5.4 ppm, said irrigating step being carried out for a time sufficient to exterminate pests in said soil, and then being interrupted so that oxygen content in the soil is at least partially restored.

10. A method as in claim 9, wherein the soil is irrigated with said oxygen-depleted water prior to planting of the crop.

11. The method of claim 9, wherein the soil is irrigated with said oxygen-depleted water periodically during the time in which the crop is grown in the soil.

12. The method of claim 9, wherein the soil is irrigated with said oxygen-depleted water at the time of germination, root taking and root elongation of said crop.

13. The method of claim 9, wherein said oxygen-depleted water is obtained by subjecting water to a degassing treatment using hollow fiber membrane.

14. The method of claim 9, wherein the surface of the soil is covered with a substantially air impermeable sheet during said irrigating step.

15. A method for producing a crop, which comprises irrigating soil in which said crop is grown with water obtained by dissolving carbon dioxide gas to a concentration of from 50 to 10,000 ppm in oxygen-depleted water having a dissolved oxygen concentration of not more than 5.4 ppm, said irrigating step being carried out for a time sufficient to exterminate pests in said soil, and then being interrupted so that oxygen content in the soil is at least partially restored.

16. A method as in claim 15, wherein the soil is irrigated with said oxygen-depleted water prior to planting of the crop.

17. The method of claim 15, wherein the soil is irrigated with said oxygen-depleted water periodically during the time in which the crop is grown in the soil.

18. The method of claim 15, wherein the soil is irrigated with said oxygen-depleted water at the time of germination, root taking and root elongation of said crop.

19. The method of claim 15, wherein said oxygen-depleted water is obtained by subjecting water to a degassing treatment using a hollow fiber membrane.

20. The method of claim 15, wherein the surface of the soil is covered with a substantially air impermeable sheet during said irrigating step.

* * * * *